United States Patent [19]

Benton, Jr. et al.

[11] Patent Number: 5,519,808
[45] Date of Patent: May 21, 1996

[54] TRANSCRIPTION INTERFACE FOR A WORD PROCESSING STATION

[75] Inventors: Richard C. Benton, Jr., Atlanta; Scott G. Henion, Stone Mountain; John T. McKenna, II, Lawrenceville, all of Ga.

[73] Assignee: Lanier Worldwide, Inc., Tucker, Ga.

[21] Appl. No.: 28,973

[22] Filed: Mar. 10, 1993

[51] Int. Cl.$^6$ ........................................... G10L 3/00
[52] U.S. Cl. ..................... 395/2.79; 395/2.81; 395/2.87; 369/25; 369/29; 379/67
[58] Field of Search ............................. 395/2, 2.86, 2.79, 395/2.81; 369/25, 29; 379/67; 364/419

[56] References Cited

U.S. PATENT DOCUMENTS

| | | | |
|---|---|---|---|
| 4,205,351 | 5/1980 | Michals | 360/4 |
| 4,319,337 | 3/1982 | Sander et al. | 364/900 |
| 4,328,397 | 5/1982 | Chamberlin | 179/6.09 |
| 4,430,726 | 2/1984 | Kasday | 364/900 |
| 4,462,085 | 2/1984 | Yamamoto et al. | 364/900 |
| 4,627,001 | 12/1986 | Stapleford et al. | 364/513.5 |
| 4,817,127 | 3/1989 | Chamberlin et al. | 379/67 |
| 4,856,069 | 8/1989 | Kolodny et al. | 381/52 |
| 4,969,136 | 11/1990 | Chamberlin et al. | 369/29 |
| 5,278,943 | 1/1994 | Gasper et al. | 395/2 |
| 5,280,430 | 1/1994 | Woods et al. | 364/419 |

*Primary Examiner*—Allen R. MacDonald
*Assistant Examiner*—Richemond Dorvil
*Attorney, Agent, or Firm*—Jones & Askew

[57] ABSTRACT

A transcription interface (10), connected to a general purpose digital computer (11) and a digital dictation recorder (20), for controlling various transcription functions and for automatically transferring information concerning dictation from the recorder (20) to an application program running on the digital computer (11). The recorder (20) generates a sequence of digitized dictation signals including a dictation segment and a digitized identification signal containing information corresponding to the dictation segment. The transcription interface (10) supplies an audio signal to an audio port (43) by converting the digital dictation signal to a signal that audibly reproduces the dictation for transcribing by a transcriptionist. The transcription interface (10) also formats the digitized identification signal to generate a message signal having a signal format compatible with the interface (10). In response to an interrupt signal generated by a timer interrupt circuit (17) of the computer (11), the transcription interface (10) automatically sends the message signal to an application program running on the computer (11) for display by a video display (14) connected to the computer (11). In response to an interrupt signal generated by the application program, the transcription interface (10) supplies a status signal containing information concerning the operation of the application program to the recorder (20). The operation of certain keys on a keyboard (13) connected to the computer (11) generates keyboard interrupts that initiate various transcription control functions by the transcription interface (10).

39 Claims, 6 Drawing Sheets

```
                    JOB INFORMATION
                    ================  Jun-20 9:50:10
                    Patient # 678803 ========
Phys: 345 Anderson  on 06/20/92 6:50
Station 11 Dept 12  Status: TP
WORK TYPE: 6        <Total Prod>
                    Since 06/19/92
                    Jobs: 20
                    Mins: 83.4
```

FIG. 5

TRANSCRIPTION INTERFACE FOR A WORD PROCESSING STATION

TECHNICAL FIELD

The present invention relates generally to devices for the transcription of dictation, and more particularly, relates to an apparatus usable in connection with a general purpose digital computer for accepting dictation and corresponding dictation information from a dictation recording machine, automatically supplying the dictation information to a word processing program for display to a transcriptionist, and generating audio to enable the transcriptionist to transcribe the dictation.

BACKGROUND OF THE INVENTION

For many years, central dictation systems have been widely used in businesses throughout the industrialized world. Such dictation systems typically include dictate stations and transcribe stations connected to one or more centrally located recording machines via dedicated wiring at the physical location of a business. Users of the dictate stations located throughout the business can dictate messages for recording by the recording machine, and transcriptionists using transcribe stations positioned in other locations can transcribe the recorded dictation. Thus, a central dictation system permits the physical separation of users of dictate stations from transcriptionists using transcribe stations, while maintaining a central location for the storage and retrieval of dictated messages.

One example of a central dictation system includes a recorder using an endless loop of magnetic tape as the recording medium. For the endless tape recorder, the user dictates a message onto the endless tape loop while, at the same time, a transcriptionist can transcribe a previously recorded message that is stored on the endless tape loop. Another type of recorder used in a central dictation system is a central cassette changer device that records dictated messages onto individual recording media, such as magnetic tape cassettes. In contrast to the endless tape recorder, the central cassette changer device uses a fresh cassette for recording dictation and provides the transcriptionist a recorded dictated message stored on a cassette. Accordingly, dictation and transcription cannot be performed concurrently on the same tape cassette for the central dictation system using a central cassette changer device.

A transcriptionist generally uses a dedicated transcribe station located at the transcriptionist's work location to control various functions of the remote central recorder via the dedicated cabling of the central dictation system. The typical transcribe station controls the speed, volume, and tone of the audio playback of a recorded message by the connected recorder. For more modern central dictation systems, the transcribe station often includes a numeric or alphanumeric display to supply information useful to the transcriptionist. Such transcribe station displays commonly display a number identifying the work to be transcribed, the date and time the work was dictated, the originator's name or identification number, the work type or record number, or the time remaining in a current piece of work. The recorder sends the display information to the transcribe station via the dedicated cabling of the central dictation system. The display information provides the transcriptionist with an indication of the type of document format or form to be used during transcription of a dictation segment and generally assists the transcriptionist's scheduling of works to be transcribed. For selected reports or forms, the transcriptionist also may incorporate certain portions of the displayed information within the transcribed document.

Many businesses today use small general purpose digital computers, such as an IBM personal computer (PC) or an IBM compatible computer, to support word processing applications. Accordingly, the transcription of recorded dictation in business environments typically takes place by the use of a small general purpose digital computer. Such a computer generally occupies a substantial amount of the transcriptionist's desk space, thereby leaving little additional space for the placement of the transcribe station on the desk within easy reach and convenient view of the transcriptionist. Thus, a transcriptionist would benefit by the implementation of a transcribe station as a peripheral device that fits within an expansion slot of a typical general purpose digital computer.

At least one vendor of central dictation systems, Lanier Worldwide, Inc., the assignee of this application, has developed a transcription control device that plugs into an expansion slot of a general purpose digital computer system. The transcription control device connects to the computer busses and thereby permits a transcriptionist to control recorder functions by the operation of particular keys on a keyboard connected to the computer. A control program, which runs on the computer in a "terminate but stay resident" (TSR) mode, implements the control functions normally found on a transcribe station by redirecting keyboard interrupts generated by the operation of certain keys to a program code that executes the selected control functions. Although the transcription control device enables the transcriptionist to control selected transcribe functions via the computer used for transcription, the device does not operate to transfer any display information from the recorder to the computer. Thus, the convenience gained by the use of a transcription control device installed within the computer used for transcription is offset by the loss of descriptive information supplied by the recorder for display by the conventional transcribe station.

Therefore, there is a need for a transcription device of a central dictation system that (1) operates with a small general purpose digital computer system for the control of transcription functions and (2) automatically transfers descriptive information concerning a dictation segment from the central recorder to the word processing program for display by the computer. The present invention is preferably embodied as a peripheral device that connects to the busses of a small general purpose digital computer by directly plugging the device into an expansion slot, thereby saving operating space at the transcriptionist's desk and providing convenient access to transcription control functions via certain keyboard key strokes. The present invention also automatically transfers descriptive information associated with a particular dictation segment being transcribed to the word processing program running on the computer for display by a monitor connected to the computer.

SUMMARY OF THE INVENTION

The present invention was conceived to create a convenient integrated environment for the transcriptionist to control the functions of the recording machine, as well as to receive descriptive information concerning the dictated work from the recording machine, by the use of the digital computer that runs a word processing program to effect the transcription in progress. Generally stated, the present invention is a transcription interface, connected to a general purpose digital computer and to a digital dictation recorder, for controlling various transcription functions and for automatically transferring display information from the recorder to an application program running on the digital computer. During dictation, the digital dictation recorder generates a sequence of digitized dictation signals including a dictation segment or work and a digitized identification signal containing information corresponding to the dictation segment. Specifically, the recorder produces the dictation segment by digitally recording the voice of the dictating party and generates the digitized identification signal in response to the dictating party's inputs provided via a keypad or keyboard. The digital computer, which includes a computer central processing unit, a computer memory, a computer clock, a periodic timer interrupt circuit, a manual input device such as a keyboard, and a video display, runs an operating system having a vectored interrupt handler system for processing interrupt signals. An application program, such as a word processing program, runs on the digital computer and is used by a transcriptionist for the transcription of the dictation segment.

The transcription interface supplies an audio signal to an audio port of the transcription interface by converting the digital dictation signal to an audio signal that audibly reproduces the dictation for transcribing by the transcriptionist. The transcription interface also formats the digitized identification signal to generate a message signal having a signal format compatible with the processor of the transcription interface. In response to the vectored interrupt handler system processing a first type of interrupt signal, the transcription interface automatically sends the message signal to the application program, preferably a word processing program, for display by the video display. The display thereby provides the transcriptionist with information concerning the dictation segment to be transcribed by displaying the message signal prior to transcription. The first type of interrupt signal is generated by the periodic timer interrupt circuit, in this case, part of a standard IBM PC or compatible computer system.

Similarly, the application program supplies status signals having information concerning the operations of the application program to the transcription interface in response to the vectored interrupt handler system processing a third type of interrupt signal generated by the application program. In turn, the transcription interface formats the status signals to be compatible with the recorder and thereafter send the formatted status signals to the dictation recorder. Thus, the application program informs the recorder about the status of application program operations, such as the completion of a transcribed work, via the transcription interface.

Another aspect of the present invention is that the transcriptionist can use the keyboard to control various transcription functions, such as adjustment of the volume, the tone, and the playback speed of the audio signal that contains the reproduction of the dictation segment. Specifically, the transcription interface controls certain transcription functions in response to the vectored interrupt handler system processing a second type of interrupt signal that is generated upon operation of the keyboard of the computer. For example, the video display presents the dictation segment information carded by the message signal in response to the transcriptionist operating a selected key.

More particularly described, the present invention uses a control program, preferably running on the computer in a "terminate but stay resident" mode, to support the implementation of the display and control functions normally found on a transcription station console. The control program redirects the selected types of interrupt signals, such as the interrupt signals generated by the periodic timer interrupt circuit, the computer keyboard, and the application program running on the computer, to particular portions of program code residing in computer memory. The program code executes a predefined operation in response to a selected interrupt signal. For example, the control program associated with the present invention redirects the second type of interrupt generated by a keyboard interrupt handling routine running on the computer to a portion of the control program that inspects same for operation of particular keys dedicated to transcribe control functions. This is a process familiar to those skilled in the art of creating memory resident programs and the result is often referred to as the creation of one or more "hot keys".

Therefore, it is an object of the present invention to provide a transcription interface connected to a digital dictation recorder and a general purpose digital computer for automatically transferring information concerning a dictation segment from the recorder to an application program running on the computer.

It is another object of the present invention to provide a transcription interface, embodied as a plug compatible peripheral card for a conventional personal computer, which, in conjunction with a memory resident control program, uses a video output device connected to the computer to display information associated with a dictation segment prior to the transcription of the audio portion of the dictation segment.

It is a further object of the present invention to provide a transcription interface resident on a circuit board that plugs into an expansion slot of a conventional personal computer, which may be operated solely by a foot pedal and keystrokes on the computer's keyboard, and which allows the automatic transfer of information concerning a dictation segment from the digital recorder to a word processing program that runs on the computer for use by a transcriber for transcribing the dictation segment.

It is a further object of the present invention to provide a transcription interface to efficiently utilize the work space available to a transcriptionist by combining the transcription control and the information display functions of a conventional transcribed station console aboard a plug compatible peripheral card for a conventional personal computer that runs the word processing program used by the transcriber for transcribing dictation, That the present invention meets these objects and overcomes the drawbacks of the prior art will be appreciated from the detailed description below.

DETAILED DESCRIPTION OF THE PREFERRED EMBODIMENT

Figure 1:
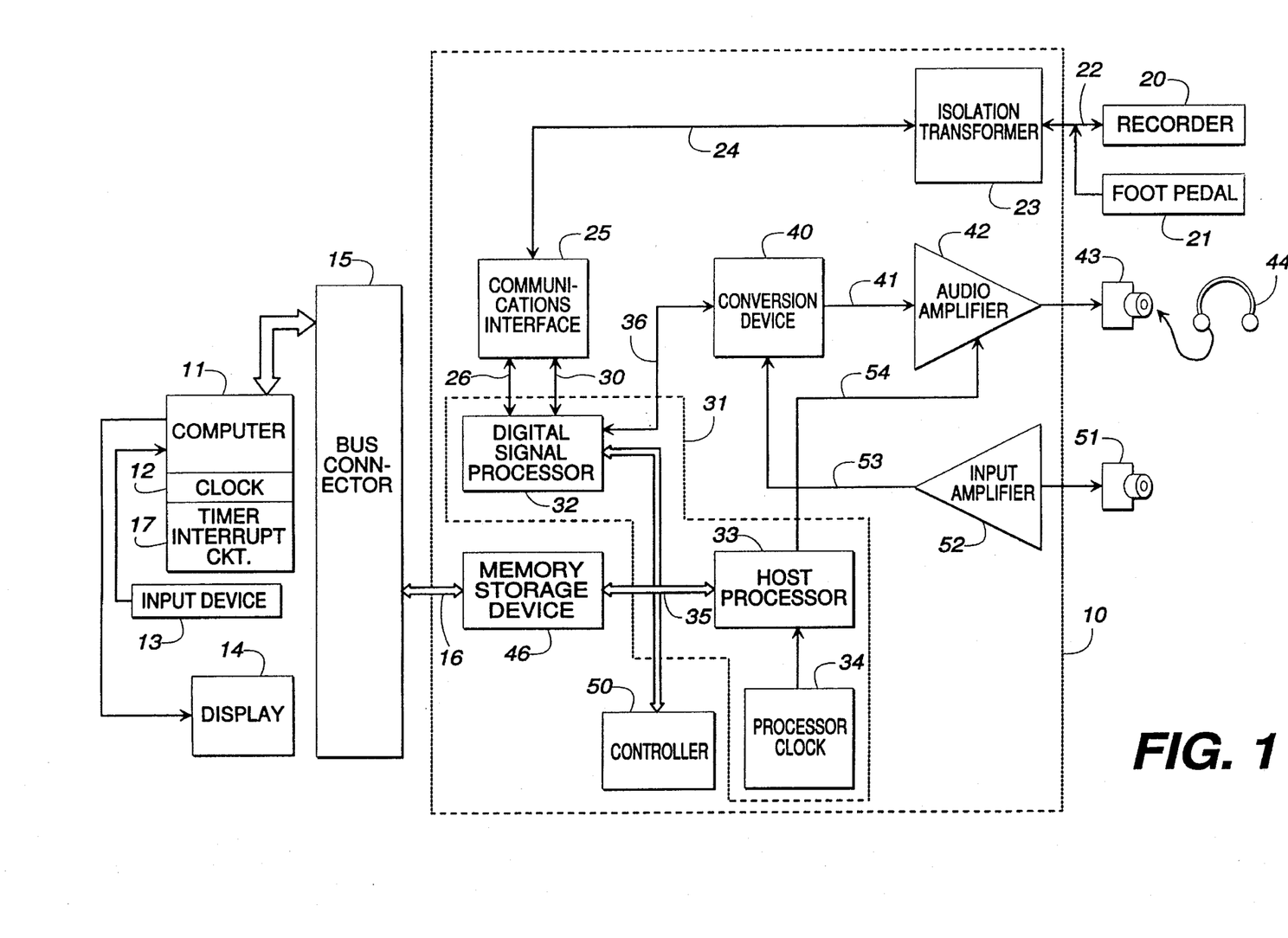
FIG. 1 is a block diagram of the preferred embodiment of the present invention.

Turning now to the drawing, in which like numerals represent like components throughout the several figures, FIG. 1 is a block diagram of the preferred embodiment of the present invention, a transcription interface 10. As noted hereinabove, the preferred embodiment of the present invention is designed to be used in a conventional general purpose computer, preferably a microcomputer of the type generally referred to as a personal computer system. The transcription interface 10 is connected to a computer 11, typically an IBM PC or a compatible computer system via a bus connector 15, and to a recorder 20, preferably a digital dictation recorder for a central dictation system via conventional cabling 22. A foot pedal 21 proximately located to the computer 11 is also connected to the transcription interface 10 via the cable 22.

The computer 11 includes an internal computer clock 12, a periodic timer interrupt circuit 17, a computer central processing unit (not shown), and a computer memory (not shown). A selectively operable manual input device 13, such as a keyboard, and a video display device 14, such as a cathode ray tube (CRT) monitor, are connected to the computer 11. The computer 11 is capable of running various application programs intended for operation with the preferred IBM PC, including commercially available word processing programs commonly used by transcriptionists for transcribing dictation. The computer 11 also runs an operating system having a vector interrupt handling system. Details of the operation of an IBM PC-type computer, its handling of various interrupt signals generated by a periodic timer interrupt circuit, an application program running on the computer, or a keyboard, and the writing of information to a video display are well documented and known to those skilled in the art.

The preferred embodiment of the present invention is a transcription interface, implemented by a circuit board and an associated control program, which can be operated through an IBM PC-type computer or an IBM PC compatible by plugging the transcription interface 10 into an expansion slot such as the bus connector 15. A PC bus 16, which is a computer bus that includes address, data, and control busses for the computer 11, connects the bus connector 15 to the transcription interface 10 upon the installation of the interface 10 within the expansion slot. Other embodiments of the present invention operable in connection with other microcomputers may be built with the aid of the teaching of this specification. Those persons skilled in the art will recognize that the present invention also can be constructed as a peripheral device that connects to a serial or parallel port of the personal computer via a conductor rather than being a plug compatible peripheral device connected to an expansion slot.

The preferred recorder 20 is a digital dictation recorder representative of the type used in a central dictation system having transcribe stations and dictation stations connected to one or more centrally located recorders via extensive conduit wiring distributed throughout the physical plant of a business. During dictation operations, the recorder 20 generates a sequence of digitized dictation signals, including a dictation segment containing the dictated work and a digitized identification signal containing information corresponding to the dictation segment. The dictation segment information typically includes descriptive information, also referred to as header data, directed to the origination and the subject of the dictated work. In response to the digitized dictation signals carried by the conventional cabling 22, the interface 10 operates upon the dictation segment to supply an audible dictation segment intended for transcription by a transcriptionist. In parallel, the transcription interface 10 also automatically transfers the information corresponding to the dictation segment to the display 14, via the word processing program running on the computer 11, for eventual display of such information to the transcriptionist.

The transcription interface 10 is further operative to control various transcription functions, such as the adjustment of the volume, tone, and playback speed of the audio signal containing an audible reproduction of the dictation segment for transcribing by the transcriptionist. The transcriptionist uses the keyboard 13 and the foot pedal 21 to control the various transcription functions, thereby permitting the transcriptionist to control the transcription operation while maintaining his or her attention to transcribing the dictated work at the computer 11. Moreover, the transcription interface 10 also can be used as a dictate station by accepting an external signal from an external audio source, such as a hand held microphone. The interface 10 digitizes the external signal and supplies the recorder 20 with a properly formatted digitized signal for recording by the recorder 20. It will be understood by those skilled in the art that while the preferred embodiment is designed to be used in connection with a central dictation system, embodiments of the present invention also can be used with individual recording machines.

Focusing now upon the elements of the transcription interface 10 within the dashed line of FIG. 1, an isolation transformer 23 electrically isolates the recorder 20 from the remaining circuitry of the transcription interface 10. For the preferred central dictation system, it is imperative that the present invention provide electrical isolation between the circuits of the transcription interface 10 and the recorder 20 to thereby protect the transcription interface 10 and the connected computer 11 from voltage surges and transients carried by the cable 22. The isolation transformer 23 also operates as a filter by reducing the level of noise present on the cable 22 that would otherwise be input to the circuitry of the interface 10.

A communications interface 25 receives the sequence of digitized dictation signals from the isolation transformer 23 via a serial line 24. The communication interface 25, which is preferably an Integrated Services Digital Network (ISDN) universal digital loop transceiver (UDLT), decodes the sequence of digitized dictation signals containing voice and header data and transfers the decoded data in a telecommunications standard "2B+D" format to a processor 31 via the serial lines 26 and 30. Specifically, the serial line 26 carries digitized voice data in a µlaw pulse code modulation (PCM) data format that represents the dictation segment and the serial line 30 carries a synchronous bit stream of header data that represents the digitized identification signal. The communications interface 25, which is preferably a type MC145426 UDLT manufactured by Motorola in Phoenix, Ariz., passes the digitized voice data and the header data to the processor 31 at a continuous data rate of approximately 80 Kbits/second.

A digital signal processor 32, which is one of two processors for the processing system 31, translates a first output of the communications interface 25, otherwise referred to as a first signal, by digitally adjusting the tone and volume of the voice data carried by the line 26. Variable digital filters are used to implement the tone and volume controls. The digital signal processor 32 also uses a tone generator to add "beeps" and ready tones to the incoming digitized voice data to thereby supply the transcriptionist with conventional transcription status signals in connection with the dictation to be transcribed. For example, a ready tone is used to alert the transcriptionist of work available to be transcribed. Upon completion of such translation operations, the digital signal processor 32 outputs a translated signal to a conversion device 40 via a line 36.

The digital signal processor 32 also processes the digitized identification signal supplied as a second output by the communications interface 25 via the serial line 30, otherwise referred to as a second signal. The digital signal processor 32 reads the serial bits and converts the synchronous header data to a message signal containing parallel data for processing by a host processor 33, which is the other processing element of the processor 31. The host processor 33, which is connected to a processor clock 34 having a processor clock period, controls the overall operations of the transcription interface 10.

Figure 2:
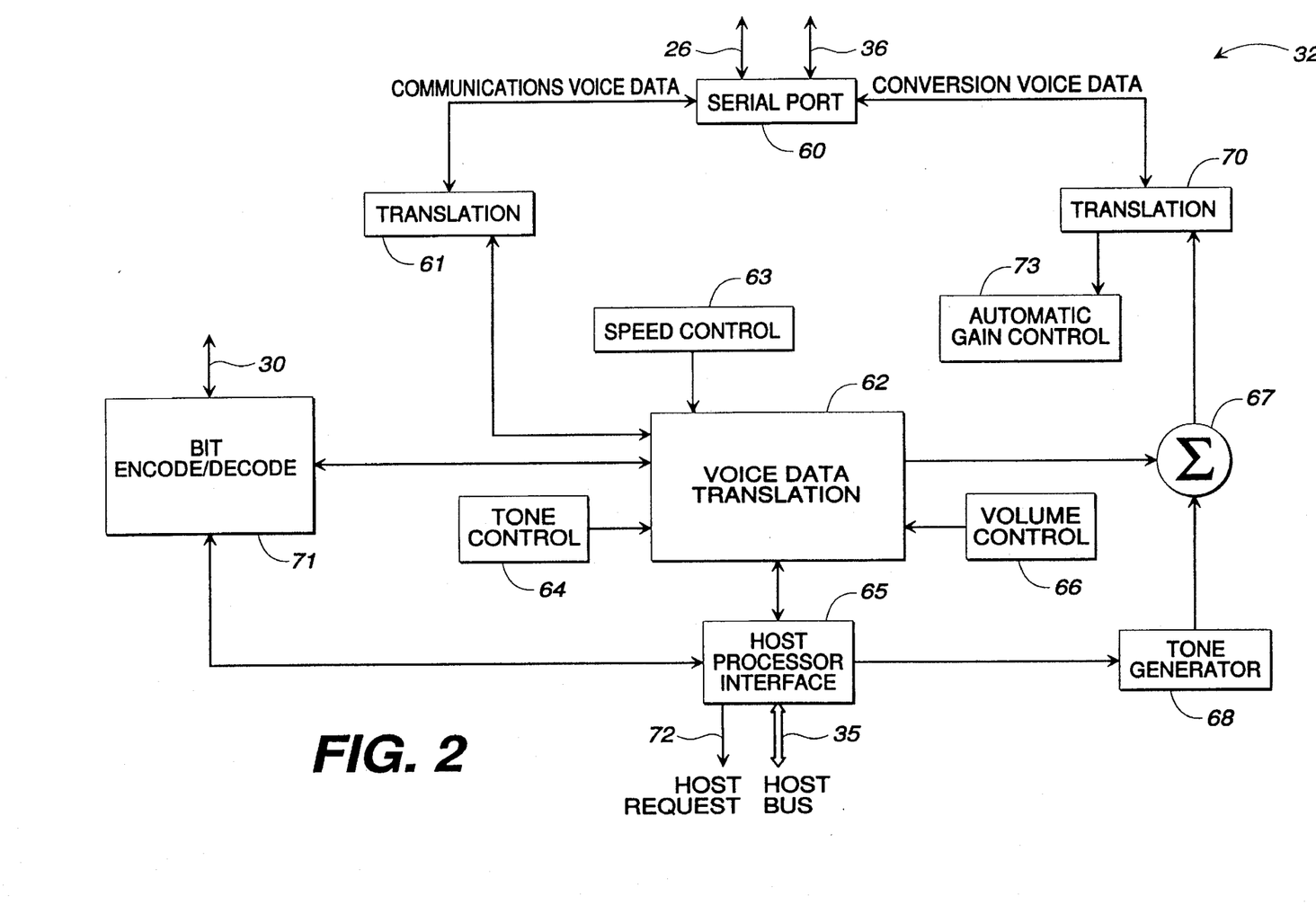
FIG. 2 is a block diagram of the preferred digital signal processor shown in FIG. 1.

FIG. 2 shows a block diagram of the digital signal processor 32. It will be appreciated that the functions supplied by the digital signal processor 32 are largely implemented by modules of program code. Program code and data are stored in either external memory connected to the processor 32 or internal memory. Referring now to FIGS. 1–2, a serial port 60 receives the first signal that represents the digitized voice data from the communications interface 25 via the serial line 26. The serial port 60 outputs the voice data to a translation module 61, which operates to convert the μlaw PCM data format used by the communications interface 25 (and the conversion device 40) to a linear PCM data format used by the digital signal processor 32. The translated voice data are output to a voice data translation module 62, which receives transcription control inputs from a speed control module 63, a tone control module 64, and a volume control module 66. The voice data translation module 62 adjusts the characteristics of the voice data in response to the inputs supplied by the control modules 63, 64, and 66, and the control signals generated by the host processor 33. Specifically, the host processor 33 controls the translation operations conducted by the voice data translation module 62 by sending control signals to the digital signal processor 32 via a host bus 35, which includes address, data, and control busses. A host processor interface 65, which provides a communications interface between the digital signal processor 32 and the host bus 35, passes the control signals to the voice data translation module 62. The host processor interface 65 also passes a host request signal 72 from the digital signal processor 32 to the host processor 33 to supply an indication that the recorder 20 is sending a stream of digitized dictation signals to the transcription interface 10.

Upon the completion of the speed, tone, and volume control operations, the voice data translation module 62 outputs the voice data to a summation module 67, which also accepts tone signals and beeps from a tone generator 68. To output a tone in connection with a dictation segment, the host processor 33 sends a certain control signal via the host bus 35 to the host processor interface 65 which, in turn, supplies the control signal to the tone generator 68. The summation module 67 sums the voice data output by the voice data translation module 62 with the tones or beeps generated by the tone generator 68 to supply to a translation module 70 a digital audio signal having both a voice component and a tone component. After conducting a linear PCM format-to-μlaw PCM format conversion, the translation module 70 passes the digital audio signal to the serial port 60 for transmission to the conversion device 40 via the line 36.

The conversion device 40 decodes the output of the digital signal processor 32 on line 36 by operating as an analog-to-digital converter and converting the digital audio signal containing digitized voice data to an analog audio signal. The conversion device, which is preferably a coder/decoder device, such as the type MC145503 CODEC manufactured by Motorola in Phoenix, Ariz., supplies the audio signal via a line 41 to an audio amplifier 54.

An audio amplifier 42 amplifies the audio signal to drive a head set 44 connected to an audio port 43. The gain of the audio amplifier 42 is controlled by a pulse-width modulator (PWM) signal on line 54 that is generated by a host processor 33 of the processor system 31. The amplification of the audio signal supplied by the audio amplifier 42 is necessary because the conversion device 40 does not have sufficient power capability to drive a speaker or a headset. A transcriptionist listens to the audio representation of the dictation segment to support the transcription activity.

For the processing of the header data containing the dictation segment information, the digital signal processor 32 includes a bit encode/decode module 71 that receives the second signal from the communications interface 25 via the serial line 30. The bit encode/decode module 71 converts the synchronous header data to a parallel data format usable by the host processor 33. The host processor interface 65 passes the parallel data output by the bit encode/decode module 71, also described as a message signal, to the host processor 33 via the host bus 35.

Figure 5:
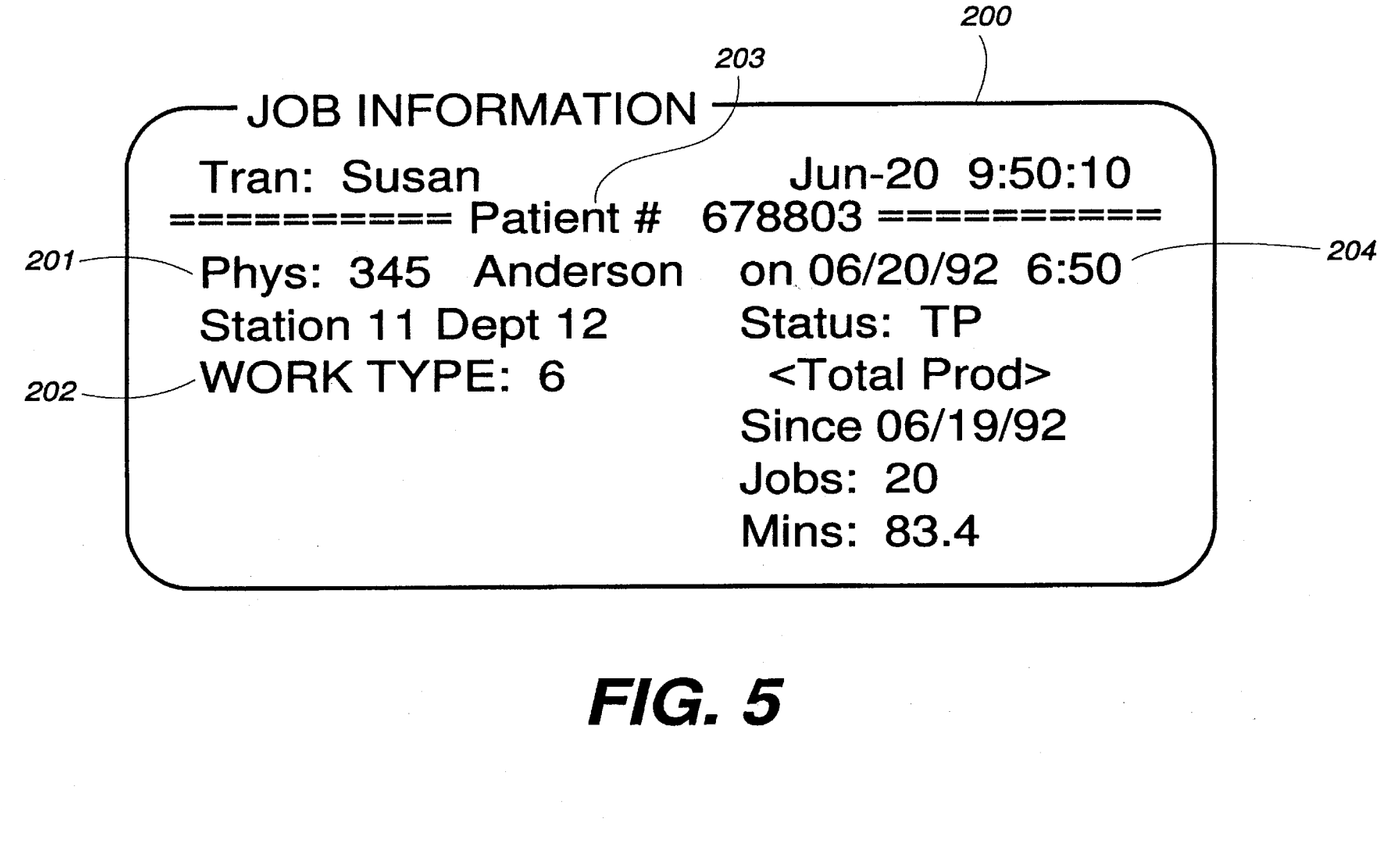
FIG. 5 is an elevational diagram of a screen display containing dictation segment information provided by the control program of the preferred embodiment.

The host processor 33 supplies the message signal to the computer 11 by storing the message signal in a memory storage device 46, preferably random access memory (RAM) connected to the processor 33 via the host bus 35. The memory storage device 46 is used for the storage of the message signal and certain display format data associated with the display of transcription control screens. The computer 11 periodically reads the memory locations containing the message signal by accessing the memory storage device 46 via the PC bus 16. The computer 11 thereafter transfers the message signal to the word processing program running on the computer 11 for eventual display of the dictation segment information provided by the message signal. Likewise, the computer 11 copies the display format data from the memory storage device 46 to computer memory allocated to display screens. The display format data, which are shown in FIG. 5, are described in more detail below. The controller 50, which is connected to each of the processors 32 and 33 and the memory storage device 46 by the host bus 35, controls access to the memory storage device 46 by the computer 11 and the host processor 33.

The transcription interface 10 also can be used for dictation by connecting by a hand held microphone (not shown) to an external audio port 51, thereby supplying an external audio signal representing the dictation to the recorder 20 via the interface 10. In this manner, the transcription interface 10 can be used as a dictate station when the interface 10 is not used by a transcriptionist to support transcription activities. The external audio port 51 passes the external signal from the signal source to an input amplifier 52. The input amplifier 52 is necessary to boost the signal level of the external signal to a threshold sufficient for processing by the interface 10. The amplified output of the input amplifier 52, otherwise referred to as an amplified external signal, is supplied to the conversion device 40 via a line 53. The conversion device 40 converts (encodes) the analog dictation signal to a digital signal and outputs a digitized external signal to the digital signal processor 32 via the line 36. The digital signal processor 32 operates to translate the external signal and generates an output via the serial line 26 to the communications interface 25. In turn, the communications interface 25 formats the digitized external signal using conventional ISDN format and supplies an output via the isolation transformer 23 for recording by the recorder 20.

When the transcription interface 10 is used for dictation, the digital signal processor 32 receives an encoded version of the dictation from the conversion device 40 via the line 36. The serial port 60 passes the output on line 36, otherwise referred to as the digitized external signal, to the translation module 70 for translation of μlaw PCM format data to linear PCM format data. The output of the translation module 70 is directed to the voice data translation module 62 via an automatic gain control (AGC) module 73, which digitally controls the gain of the external signal. The voice data translation module 62 either passes the external signal for reception by the recorder 20 or compresses the external signal for storage within computer memory (not shown) via the host processor interface 65 and the host bus 35. To send the external signal to the recorder 20 the output of the voice data translation module 62 is supplied to the serial port 60 via the translation module 61, which converts linear PCM format data to μlaw PCM format data. In turn, the serial port 60 outputs the digitized external signal to the communications interface 25 via the serial line 26 for communication to the recorder 20. The recorder 20 subsequently records the dictation represented by the digitized external signal in response to the output of the transcription interface 10.

Referring again to FIG. 1, the memory storage device 46 is preferably implemented as a synchronous dual-port RAM to permit the communication of information between the computer 11 and the recorder 20 via the transcription interface 10. The controller 50 enables the memory storage device 46 to be accessed by the computer 11 via the PC bus 16 and by the host processor 33 via the host bus 35 during different cycles of a bus clock period for the host processor 33. The dual-port RAM configuration is required for an exchange of information between the computer 11 and the transcription interface 10 because the preferred host processor 33, a type MC68HC11 microprocessor, does not have a wait state. Thus, the host processor 33 cannot be delayed if the computer 11 is accessing the memory storage device 46. It will be appreciated that a conflicting use of the memory storage device 46 is likely to arise if the computer 11 attempts to access the memory storage device 46 at a time that the host processor 33 attempts to do the same. By using the dual-port RAM configuration, the processing capabilities of the host processor 33 are efficiently used because the host processor 33 continuously operates during memory storage access operations conducted by either the computer 11 or the processor 33. The implementation and operation of a dual-port RAM are well known to those skilled in the art.

In recognition that the access time for the memory storage device 46 is typically must less than the bus clock period for the host processor 33, the controller 50 operates the memory storage device 46 at twice the frequency of the bus clock for the host processor 33. The bus clock, which has a period having a first cycle and a second cycle, is preferably implemented by dividing the processor clock signal supplied by the processor clock 34. This permits the computer 11 and the host processor 33 to access the dual-port RAM 46 during alternate bus cycles of the memory storage device 46. For the preferred embodiment, the computer 11 accesses the memory storage device 46 via the PC bus 16 during the first cycle of the bus clock period and the host processor 33 accesses the memory storage device 46 via the host bus 35 during the second cycle of the bus clock period. A more detailed description of the operations of the controller 50 is provided below with respect to FIG. 3.

A control program associated with the transcription interface 10, preferably a "terminate but stay resident" program, runs on the computer 11 and supports the implementation of the transcription display and control functions normally found on a transcribe station console. The control program resides in the computer memory and is invoked only in response to certain types of interrupt signals. Specifically, the control program supports the transfer of dictation segment information from the recorder 20 to the computer 11 via the transcription interface 10 in response to a first interrupt signal or periodic timer interrupt generated by the periodic timer interrupt circuit 17. Similarly, the control program transfers status information concerning the operation of the word processing program to the recorder 20 via the transcription interface 10 in response to a third type of interrupt signal or software interrupt generated by the application program. Furthermore, the control program supports the control of various transcription control functions in response to a second type of interrupt signal or input interrupt generated by a selected input to the keyboard 13.

For a transfer of the dictation segment information from the recorder 20 to the word processing program running on the computer 11, the host processor 33 writes the message signal having the dictation segment information to the memory storage device 46 during the second cycle of the processor clock period. In response to the first type of interrupt signal, the control program instructs the computer 11 to begin the information transfer process via the PC bus 16. In turn, the computer 11 reads the stored message signal during the first cycle of the bus clock period. It will be appreciated that the computer 11 polls the memory storage device 46 via the PC bus 16 during periodic intervals because the first type of interrupt signal is an interrupt that is periodically generated as a function of the timer interrupt circuit 17. The first type of interrupt signal is preferably a disk operating system (DOS) interrupt generated every ⅟18th of a second for the IBM PC-type computer. The control program subsequently automatically transfers the message signal to the word processing program for eventual display of the dictation segment information by the display 14.

The control program is stored in a selected portion of memory of the computer 11 upon installation of the transcription interface 10. Likewise, the word processing program running on the computer 11 also is stored within a certain portion of the computer memory. The control program and the word processing program share a selected portion of the computer memory to permit the control program to transfer the message signal to the word processing program. Thus, the control program merely loads information into a common computer memory area shared by the control program and the word processing program to allow those programs to indirectly communicate with each other. Upon a transfer of the message signal between the transcription interface 10 and the computer 11, the word processing program processes the message signal and generates a video signal to display the information corresponding to the dictation segment on the display 14. The display of the dictation segment information occurs in response to the transcriptionist pressing a selected key on the keyboard 13. This typically takes place when the recorder 20 has supplied a new dictation job for transcription and just prior to the time that the transcriptionist hears the audio signal containing the dictation segment at the audio port 43.

The preferred environment for the present invention is a central dictation system utilized by a large medical facility. The digitized identification signal output by the recorder 20 includes specific types of information concerning the corresponding dictation segment that are useful to the transcriptionist. For the preferred medical environment, the message signal includes the following information fields: the originator of the dictation, typically a patient's doctor; the type of report, such as a consultation report, a patient history report, or a physical examination report; the entry date and time for the dictation segment; and the medical record identification number, typically the identification number associated with a particular patient. The display information fields are described in more detail below with respect to FIG. 5.

As noted above, the transcription interface 10 also allows the transcriptionist to control or vary one or more control parameters of transcription, such as volume, speed, or tone by keystrokes on the keyboard 13 or by operation of the foot pedal 21. In this manner, the transcription interface 10 replaces the conventional transcribe station console because the keyboard 13 completely replaces the conventional variable speed control, typically implemented by a potentiometer and a knob, and the push button controls commonly found on a transcribe station console. By using the transcribe interface 10, the transcriptionist no longer needs to move his or her hands from the keyboard to manipulate the control parameters of the transcription activity.

When the transcriptionist wishes to adjust a selected control parameter, such as the volume at which recorded dictation is being played back, he or she operates one of a predefined set of "hot keys" for increasing or decreasing the volume. A hot key is a key on the keyboard 13 having a function other than the standard function defined by the conventional keyboard interrupt handler. Upon pressing the hot key, the pointer associated with the keyboard interrupt vector changes to initiate a new function, in this case a transcription control function.

The control program associated with the present invention, which remains resident in RAM, examines each keystroke in response to a keyboard interrupt generated by the operation of a key at the keyboard 13. In response to a keyboard interrupt, a keyboard interrupt handling routine of the control program inspects the interrupt to determine if one of the predefined control keys has been pressed by the transcriptionist. If one of the predefined keys has not been pressed, then the control program makes a call to the normal BIOS keyboard interrupt handler, and the keystroke is eventually passed to the word processing program in a well known manner. In contrast, if the particular key is one of the control hot keys associated with the preferred embodiment, the control program executes certain program codes at a memory location selected by the keyboard interrupt and thereby initiates the control function in response to the second type of interrupt signal, the keyboard interrupt.

Using the example of volume control, the control program determines the identity of the volume control key in response to the second type of interrupt signal. The control program then writes an appropriate data word to the memory storage device 46 via the PC bus 16 when the memory storage device is enabled for access by the computer 11. In turn, the host processor 33 reads the data word via the host bus 35 when the memory storage device 46 is enabled for access by the host processor 33. The host processor 33 thereafter processes the data word and, for example, increments the volume in response to the operation of the key indicating that the volume should be increased. The host processor 33 increases the volume of the dictation segment by varying the gain of the audio amplifier 42 via a control line 54.

Different commercially available word processing programs use different numbers of hot keys for implementing various functions. Therefore, the number of hot keys available for transcribe control will vary. In the preferred embodiment of the present invention, only four hot keys are available, including hot keys for increasing volume, decreasing volume, closing a transcription file, and causing a pop-up control program display to be shown on the display 14. The hot keys defined for the control program of the present invention allow the transcriptionist to adjust the most commonly used functions without interrupting word processing operations, save to operate the appropriate key on the keyboard 13. The other transcription functions, such as tone, speed, etc. are achieved by interrupting the word processing program. Less frequently used controls are not available from the keyboard unless and until a full screen display of the control program is invoked by the transcriptionist. When the control program display is presented by the display 14, the control program takes over operation of the keyboard until the program is again terminated by a terminate and stay resident operating system service.

Those skilled in the art will recognize that the routines for intercepting operation of a hot key, transferring the data from the computer 11 to the host processor 33 via the memory storage device 46, and subsequently terminating operation of the control program are all done within a small fraction of a second. Therefore, to the user, operation of the constantly available hot keys has the full appearance of having no interruption whatsoever to operation of the word processing program. Indeed, it is unlikely that the transcriptionist could return to the next keystroke intended for the word processing program before the control program used with the transcription interface 10 had finished its task of servicing an input from one of the constantly available hot keys.

The control program associated with the transcription interface 10 also allows the application program running on the computer 11 to send status signals denoting the operating status of the program to the recorder 20 via the transcription interface 10. The application program, specifically a word processing program, generates a third type of interrupt signal to provide the control program with an indication that one or more status signals are ready for communication to the recorder 20. In response to the third type of interrupt signal, otherwise referred to as a software interrupt, the control program instructs the computer 11 to write the associated status signal to the memory storage device 46 via the PC bus 16 when the memory storage device is enabled for access by the computer 11. In turn, the host processor 33 reads the status signal stored in the memory storage device 46 via the host bus 35 when the device 46 is enabled for access by the host processor 33. The transcription interface 10 thereafter operates to format the status signal to supply the recorder 20 with a formatted status signal having a signal format compatible with the recorder.

Specifically, the host processor 33 sends the status signal to the digital signal processor 32 via the host bus 35, and the processor 32 converts the parallel data associated with the status signal to a data stream of serial bits. The digital signal processor 32 outputs the serial bits via the serial line 30 to the communications interface 25 which, in turn, sends the formatted status signal to the recorder 20 via the isolation transformer 23. The recorder 20 then processes the formatted status signal and conducts any required operations in response to the status signal.

The operation and implementation of a TSR program, such as the control program for the preferred embodiment, are well documented and known to those skilled in the art. For the typical vectored interrupt handling system, the computer processor unit executes program code beginning at a particular address location in response to certain types of interrupt signals having a vector that defines the computer memory address. Those persons skilled in the art will also recognize that a device driver can be used as the control program in place of the preferred TSR program. For the preferred embodiment, a device driver program is not used because a DOS driver program for the IBM PC would conduct operations at a much slower rate than the TSR program.

Figure 3A:
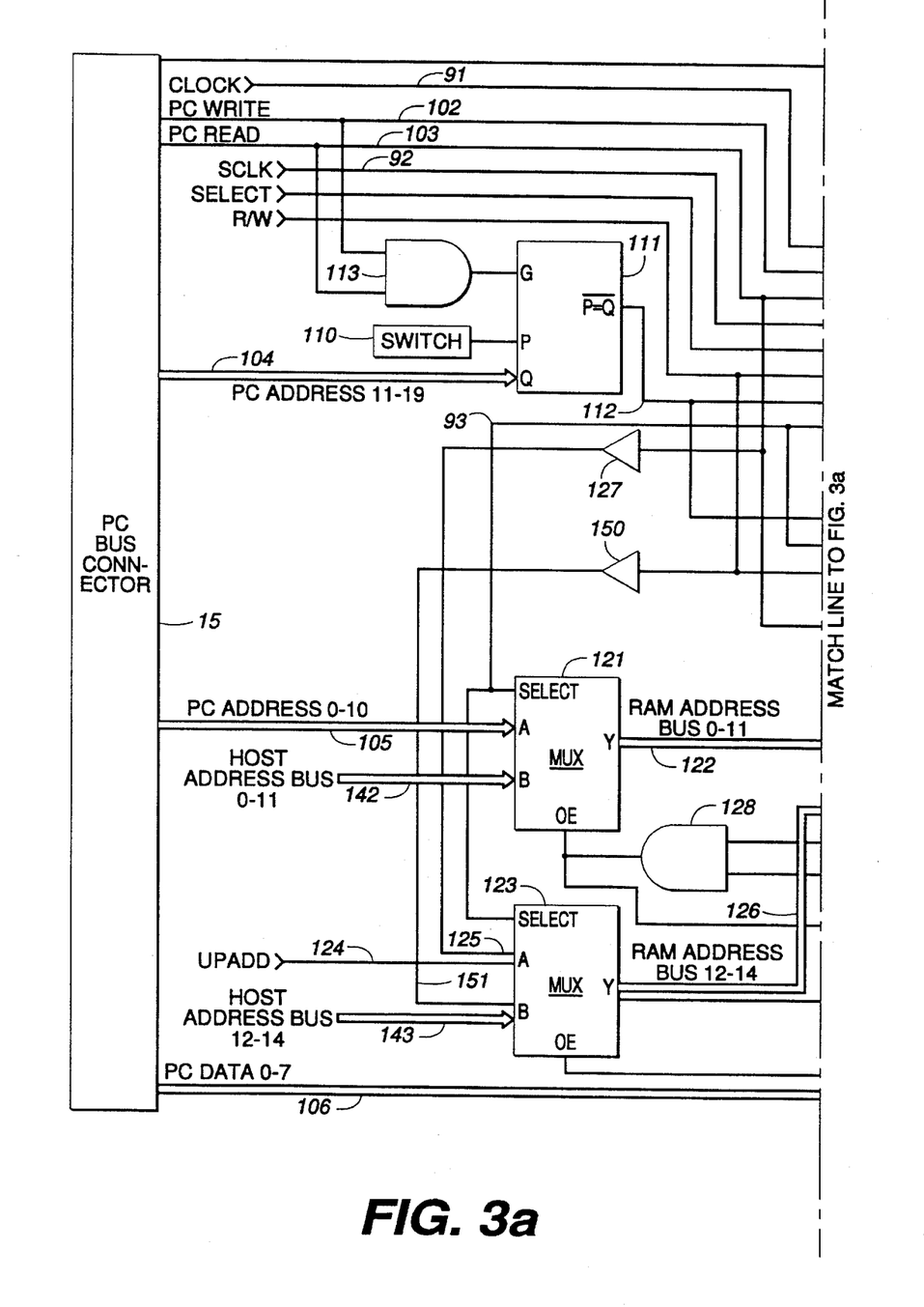
FIG. 3 is a schematic diagram of the controller shown in FIG. 1.
Figure 3B:
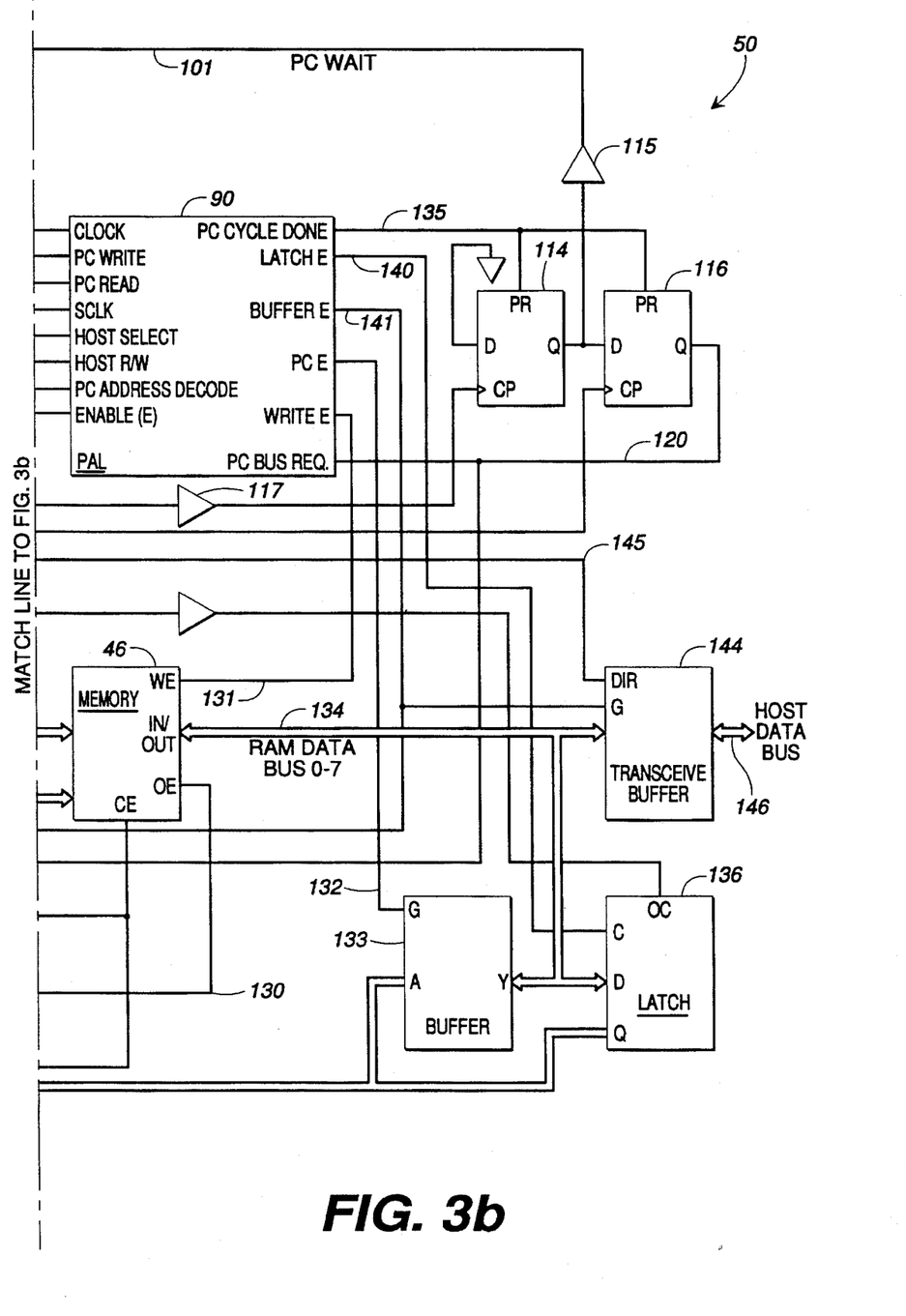

Turning now to FIG. 3, which shows a schematic diagram of the controller 50, the PC bus connector 15 is a conventional expansion slot of a typical IBM type personal computer. Accordingly, the PC bus connector 15 is connected to various signal lines and busses of the computer 11, including: PC wait line 101, a PC write line 102, a PC read line 103, a PC upper address bus 104, a PC lower address bus 105, and a PC data bus 106. When asserted, the PC wait line 101 provides the computer 11 with an indication that the computer should enter a wait state. The PC write line 102 and the PC read line 103 respectively provide the status of the computer write and read states. The PC upper address bus 104 provides address lines 11–19 of the available 20 address lines for the IBM PC-type computer. Similarly, the PC lower address bus 105 provides the remaining address lines, lines 0–10, of the IBM PC-type computer. The PC data bus 106 is an 8 bit data bus providing data lines 0–7. Details of the connectors on a PC bus connector or slot are known to those skilled in the art and described in the IBM Technical Reference Manual for the Personal Computer, Document No. 6322507, which is hereby incorporated by reference.

An address selection switch 110 is used, in an conventional manner, as one input to a type 74HCT688 comparator, the other active inputs of which are connected to the PC upper address bus 104. The switch settings of the switch 110 define a window within the computer memory of the computer 11 to enable the control program to communicate with the word processing program. A true comparison between the address defined by the switch 110 and the address on the bus 104 provides an address decode signal having an active low condition on line 112. The occurrence of an active low on line 112 and an address enable signal output by an AND gate 113, which accepts as inputs the PC write line 102 and the PC read line 103, indicate the start of a data transfer operation between the PC bus 16 and the transcription interface 10.

Figure 4:
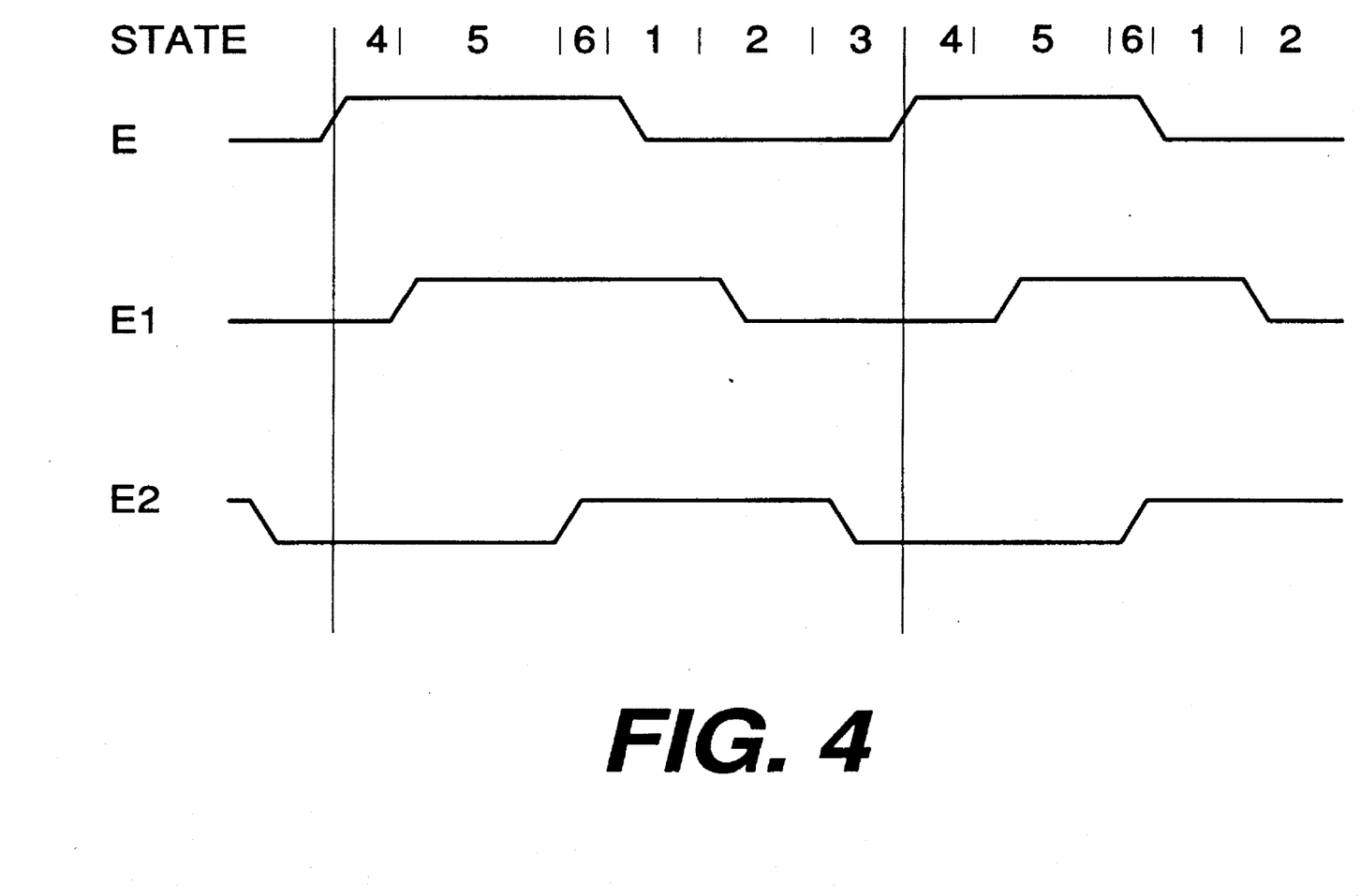
FIG. 4 is a timing diagram showing the waveforms produced by the controller of FIG. 3.

A programmable array logic (PAL) 90 provides the majority of control signals to the memory storage device 46, otherwise referred to as a dual-port RAM, and the circuitry of the controller 50. The PAL 90 is preferably a type PALC22V10 manufactured by Cypress Semiconductors. The PAL 90 accepts as an input a CLOCK signal on line 91 from the host processor 33. The CLOCK signal is generated by the central processor unit (CPU) clock for the host processor 33 and has a frequency of 8.192 MHz for the preferred 68HC11 microprocessor. The PAL 90 further accepts as an input a host bus clock signal on line 92, otherwise referred to as the SCLK line, from the host processor 33. The bus clock signal is determined by dividing the CPU clock signal by four and thereby has a preferred frequency of 2.048 MHz. Internally, the PAL 90 feeds the bus clock signal to a 2-bit shift register, thereby generating an internal 3-phase clock that is used to divide the host processor bus cycle into 6 separate states, as shown in FIG. 4. The PAL 90 outputs a bus cycle signal, otherwise referred to as the Enable signal, via line 93. The computer 11 accesses the memory storage device 46 during states 1–3, while the host processor 33 accesses the device 46 during states 4–6.

PC Write Operation

Referring now to FIGS. 3–4, a PC write operation for the dual-port RAM 46 is initiated when the PC Write line 102 is asserted by the computer 11 via the PC bus connector 15. The address decode signal output by the comparator 111 onto line 112 passes through an inverter 117 and is applied to the clock port of a first D-type flip-flop device 114, thereby clearing the flip-flop. The output of the flip-flop 114 is passed via a bus driver 115 to thereby assert the PC Wait signal via line 101 to the computer 11. In response to the assertion of the PC Wait signal, the central processing unit of the computer 11 enters a wait state.

On the rising edge of the Enable signal, the output of the flip-flop 114 is clocked into the D input of a second D-type flip-flop 116. The output of the second flip-flop 116 is supplied via line 120 to the PAL 90 and to an input of an AND gate 128. The other input of the AND gate 128 is a Buffer Enable signal output by the PAL 90 and carried on line 141. When the output of the second flip-flop 116 toggles in response to the rising edge of the Enable signal, the second flip-flop 116 outputs a PC bus request signal on the line 120. When either the PC Bus Request signal or the Buffer Enable signal is asserted, the AND gate 128 outputs an active high signal that enables each of the address multiplexers (MUX) 121 and 123 and the dual-port RAM 46. The combination of the MUXs 121 and 123 are preferably implemented as four separate multiplexers of the type 74HCT157. The memory storage device 46 is preferably a type TC55257 RAM having an access time of approximately 120 nanoseconds.

When the Enable signal output by the PAL 90 goes low upon reaching state 1, the A inputs are selected by the MUXs 121 and 123. Accordingly, the PC lower address bus 105 is selected by the MUX 121, which thereby outputs the PC lower address lines to the dual-port RAM 46 via a RAM address bus 122. The RAM address bus 122 supplies the lower address lines 0–11 to the dual-port RAM 46. Similarly, the MUX 123 selects the UPADD signal on line 124 and an inverted PC Read signal on line 125 when the Enable signal reaches state 1. The state of the UPADD signal is set by the host processor 33 to allow the computer 11 to access one of two different ranges of addresses in the dual port RAM 46. The inverted PC Read signal is output by an inverter 127, which accepts as an input the PC Read signal on the line 103. It will be appreciated that the PC read signal is not asserted by the computer 11 during the PC write operation. Thus, the dual-port RAM 46 receives the UPADD signal via a RAM upper address bus 126, which provides the upper RAM address lines 12–14, and the inverted PC Read signal via line 130.

During state 2, the PAL 90 asserts the Write Enable line 131 connected to the memory 46 and the PC Enable line 132 connected to a buffer 133. The buffer 133 is connected between the PC data bus 106 and a RAM data bus 134. When the Write Enable line 131 and the PC Enable line 132 are asserted, the buffer 133 passes the 8 bit data carried by the PC data bus 106 to the RAM data bus 134, thereby providing the PC data as inputs to the memory 46. The buffer 133 is preferably a type 74HCT244 buffer.

During state 3, the Write Enable line 131 is negated, thereby storing the PC data within the dual-port RAM 46. At the same time, the PC Cycle Done line 135, which is connected to the preset ports of each of the D flip-flops 114 and 116, is asserted, thereby clearing the outputs of the flip-flops. Thus, the PC Bus Request line 120 and the PC Wait line 101 also are cleared in response to the assertion of the PC Cycle Done line 135. The central processing unit of the computer 11 once again enters the active processing state when the PC Wait line 101 is cleared.

PC Read Operation

To initiate a PC read operation for the memory storage device 46, the PC Read line 103 is asserted by the computer 11, thereby forcing the AND gate 113 to output an active high signal that enables the comparator 111. The comparator 111 subsequently outputs an address decode signal on line 112 when the upper address lines of the computer 11 carried by the PC upper address bus 104 matches the address for the memory window shared by the control program and the word processing program as set by the switch 110. The PC address decode signal is inverted by the inverter 113 and applied to the clock port of the first D flip-flop 114, thereby clearing the state of the flip-flop. As noted above, the output of the D flip-flop 114 is passed via the bus driver 115 to supply a PC wait signal on line 101 to the computer 11, thereby forcing the computer 11 into a wait state. On the rising edge of the Enable signal, the output of the D flip-flop 114 is clocked into the D input of the second D flip-flop 116 and, in response, the output of the flip-flop 116 supplies the PC Bus Request signal to the PAL 90 via the line 120. Similar to the PC write operation, the PC Bus Request signal on line 120 supplies the PAL 90 with an indication that a PC data transfer operation is in progress. The PC Bus Request signal also enables the memory 46 and the MUXs 121 and 123.

When the PAL 90 reaches state 1, the Enable signal carried by the enable line 93 selects the A inputs of the MUXs 121 and 123. Accordingly, the MUX 121 outputs the PC lower addresses to the dual-port RAM 46 via the RAM lower address bus 122. Likewise, the MUX 123 outputs the UPADD signal via the RAM upper address bus 126 to the memory 46 and the inverted PC Read signal to the memory 46 via the line 130. The inverted PC Read signal enables the output lines of the memory 46, thereby sending the addressed data to the D inputs of an output latch 136 via the RAM data bus 134.

During state 2, the PAL 90 clocks the output latch 136 by asserting the Latch Enable line 140. The latch 136, which is preferably a type 74LS373 transparent latch, is connected to the PC data bus 106 and to the RAM data bus 134. In response to the Latch Enable signal on line 140, the Q outputs of the latch 136 follow the latch D inputs and, accordingly, the latch 136 transfers the addressed data from the RAM data bus 134 to the PC data bus 106.

During state 3, the PAL 90 negates the Latch Enable line 140, thereby disabling or latching the latch 136. At the same time, the PAL 90 asserts the PC Cycle Done signal on line 135, thereby clearing the outputs of the D flip-flops 114 and 116. The PC Wait signal on line 101 and the PC Bus Request signal on line 120 are thereby cleared in response to the PC Cycle Done signal, thereby allowing the central processing unit of the computer 11 to once again begin active processing operations.

The latch 136 is only used during the PC read operation because this operation is significantly slower than the PC write operation. In recognition that the memory access interval is limited for the computer 11, the data output from the memory 33 is latched into the latch 136 prior to sending the data to the computer 11. This ensures that the computer 11 receives all of the addressed data even if the read operation actually extends beyond the memory access time for the computer 11. In other words, the latch 136 permits the computer 11 to receive the data from the memory 46 during the states 4–6, if necessary, when the host processor 33 is accessing the memory 46.

During PC write and read operations, the PAL 90 instructs the computer 11 to enter a wait state via the PC wait signal carried by the line 101 because the computer 11 conducts read or write operations with the memory 46 only upon the occurrence of two timing events. First, the control program running on the computer 11 receives an interrupt signal, such as the first type of interrupt signal, which provides the computer 11 with an indication that it is time once again to poll the memory 46. Second, the computer 11 accesses the memory 46 only when the appropriate access time occurs, the first cycle of the bus clock period, as shown by states 1–3 in FIG. 4. Thus, even after the control program receives the appropriate interrupt signal and cues the computer 11 to poll the transcription interface 10, the computer 11 must wait to conduct read or write operations with the memory storage device 46 until the appropriate memory access interval occurs.

The PAL 90 disables access of the memory 46 by the computer 11 during the states 4–6.

Host Processor Write Operation

During state 4, the PAL 90 asserts the Enable signal on line 93 and thereby selects the B inputs to the MUXs 121 and 123. The PAL 90 also asserts the Buffer Enable signal on line 141, thereby enabling the RAM 46, the outputs of the MUXs 121 and 123, and a transceive buffer 144. Specifically, the Buffer Enable signal is passed by the AND gate 127 to each of the output enable ports of the MUXs 121 and 123 and to the enable port of the dual-port RAM 46. The PAL 90 supplies the Buffer Enable signal on line 141 directly to the transceive buffer 145. Thus, the MUX 121 transfers the host lower address signals carried by the host lower address bus 142 to the memory 46 via the RAM lower address bus 122. Likewise, the MUX 123 transfers the host upper address bus signals carried by a host upper address bus 143 to the memory 46 via the RAM upper address bus 126.

During state 4, the PAL 90 also selects the direction of the transceive buffer 144 by asserting a Host Read/Write signal on line 145. For the host processor write operation, the direction of the transceive buffer 144 is set toward the memory 46 to permit the host processor 33 to transfer data to the memory 46. The transceive buffer 144, which is preferably a type 74HC245 transceiver buffer, is connected between a host data bus 146 and the RAM data bus 134. For the host write operation, the host processor 33 sends 8 bit data to the transceive buffer 144 via the host data bus 146. In turn, the enabled buffer 144 outputs the data to the input port of the memory 46 via the RAM data bus 134.

During state 5, the PAL 90 asserts the Write Enable signal on line 131, thereby enabling the host processor 33 to write data to the memory 46 via the signal path provided by the RAM data bus 134, the transceive buffer 144, and the host data bus 146. The PAL 90 negates the Write Enable signal on line 131 during state 6, thereby latching the data from the host processor 33 into the memory 46.

Host Processor Read Operation

As described above during state 4, the PAL 90 enables the MUXs 121 and 123 to output the host address signals (bits 0–14) to the memory 46 via the RAM address buses 122 and 126. At the same time, the PAL controller 90 enables the memory 46 and the transceive buffer 144 via the Buffer Enable signal on line 141, and selects the direction of the transceive buffer via the Host Read/Write signal on line 145. For the host processor read operation, the PAL 90 selects the direction of the transceive buffer 144 to be from the memory 46 to permit the host processor 33 to read data from the memory 46.

The Host Read/Write signal on line 145 is inverted by an inverter 150 and the inverted signal is applied to a B-type input of the MUX 123 via the line 151. The MUX 123 passes the inverted Host Read/Write signal to the output enable port of the memory 46 via the line 130, thereby enabling the outputs of the memory 46. In this manner, the host processor 33 reads data from the memory 46 during states 4–6. At the end of state 6, the PAL 90 disables the dual-port RAM 46 and prevents the host processor 33 from accessing the memory 46 during the time interval that the computer 11 is accessing the memory, the states 1–3.

During the states 1—3, the PAL 90 disables access of the memory 46 by the host processor 33 to prevent a memory access conflict between the computer 11 and the host processor 33.

FIG. 5 shows a diagram of a job information display 200 provided by the display 14 in response to the automatic transfer of dictation segment information from the recorder 20 to the word processing program running on the computer 11 via the transcription interface 10. The job information display, as well as other display windows providing useful information to the transcriptionist, are generated on the display 14 (FIG. 1) when the hot key for invoking such a control program display is operated from the keyboard 13. The display is continuously updated while waiting for another keystroke by the transcriptionist.

Referring now to FIG. 5, the dictation segment information transferred from the recorder 20 to the display 14 comprises the provider ID and name fields 201, the report or work type field 202, the patient medical record number field 203, and the data dictation field 204. It will be appreciated that those fields represent demographic data associated with the preferred environment for the present invention, specifically a large medical facility. Those skilled in the art will recognize that types of dictation segment information that are useful in other operating environments can also be implemented by the present invention.

For the preferred embodiment, the provider identification and name field 201 shown in the job information display 400 specifically identifies the name of the patient's physician and the physician's identification number. Accordingly, the information shown in field 201 informs the transcriptionist that Dr. Anderson, who is physician number 345, dictated the work intended for present transcription.

The work type field 202 shown in the display 200 defines a type or class of document format or form. In this manner, the transcriptionist can efficiently select the proper document format or form prior to transcribing the associated work. In the medical environment, different document formats or forms are associated with various activities of the physician, such as a consultation, a physical examination, or a laboratory report. The number 6 displayed in the work type field 202 indicates that the form associated with that number should be used by the transcriptionist to properly transcribe the job.

The patient medical record number field 203 shown in the job information display 200 identifies the patient who is the subject of the dictated work. For example, the dictation job to be transcribed by the transcriptionist is directed to the patient number 678803. In similar fashion, the data dictation field 204 indicates the date and time that the user, in this case Dr. Anderson, dictated the present job.

The job information display includes information other than the display information transferred from the recorder 20 to the computer 11 via the transcription interface.

From the foregoing description of the preferred embodiment, it will be appreciated that the present invention encompasses the objects described hereinabove and overcomes the above cited drawbacks of the prior art. In view of the foregoing description, other embodiments of the present invention will suggest themselves to those skilled in the art. Therefore, the scope of the present invention is to be limited only by the claims below and equivalents thereof.

What is claimed is:

1. A digital transcription system comprising:

a digital dictation recorder for generating a sequence of digitized dictation signals that comprise a dictation segment and a digitized identification signal containing information corresponding to said dictation segment;

a general purpose digital computer system characterized by a computer central processing unit, a computer memory, a computer clock, a periodic timer interrupt circuit, an input device, and a video display device, and operative for running an operating system having a vectored interrupt handler system for processing a plurality of interrupt signals, said computer system further operative for running an application program; and transcription interface means, connected to said dictation recorder and said computer system, for supplying an audio signal to an audio port of said transcription interface means to communicate said dictation segment to a transcriptionist by converting said dictation segment and for generating a message signal having a signal format compatible with said transcription interface means by formatting said digitized identification signal, said message signal containing said dictation segment information of said digitized identification signal, said transcription interface means being operative to send said message signal to said application program in response to said vectored interrupt handler system processing a first type of said plurality of interrupt signals periodically generated by said periodic timer interrupt circuit, thereby supplying said dictation segment information to said application program.

2. A digital transcription system as recited in claim 1, wherein said transcription interface means controls a plurality of transcription functions in response to said vectored interrupt handler system processing a second type of said plurality of said interrupt signals generated as a plurality of input signals from said input device.

3. A digital transcription system as recited in claim 2, wherein one of said plurality of said transcription functions comprises adjustment of the volume of said audio signal.

4. A digital transcription system as recited in claim 1, wherein said transcription interface means receives a plurality of status signals containing information about the status of application program operations from said application program in response to said vectored interrupt handler system processing a third type of said plurality of interrupt signals generated by said application program.

5. A digital transcription system as recited in claim 4, wherein said transcription interface means supplies to said digital dictation recorder a plurality of formatted status signals having a signal format compatible with said digital dictation recorder by formatting said plurality of said status signals.

6. A digital transcription system as recited in claim 1, wherein said application program operates to display said information corresponding to said dictation segment on said video display device by processing said message signal.

7. A digital transcription system as recited in claim 1, wherein said application program comprises a word processing program.

8. A digital transcription system as recited in claim 1, wherein said transcription interface further comprises an external audio port for receiving an external signal containing dictation from an external source.

9. A digital transcription system as recited in claim 8, wherein said transcription interface supplies a digitized external signal to said digital recorder upon converting said external signal, said recorder operative to record said digitized external signal.

10. A dictation transcription interface for use in combination with a digital dictation recorder for generating a sequence of digitized dictation signals that comprise a dictation segment and a digitized identification signal containing information corresponding to said dictation segment and a general purpose digital computer system, characterized by a computer central processing unit, a computer memory, a computer clock, a periodic timer interrupt circuit, an input device, and a video display device, for running an application program, said computer system operative for running an operating system having a vectored interrupt handler system for processing a plurality of timer interrupt signals derived from said periodic timer interrupt circuit, a plurality of input interrupt signals from said manual input device, and a plurality of software interrupt signals from said application program, comprising:

interface means for inputting an audio signal to an audio port of said transcription interface to communicate said dictation segment to a transcriptionist by converting said dictation segment and for generating a message signal having a signal format compatible with said interface means by formatting said corresponding identification signal, said message signal containing said dictation segment information of said digitized identification signal, said interface means operative to send said message signal to said application program in response to said vectored interrupt handler system processing a selected one of said plurality of said timer interrupt signals, said application program responsive to said message signal to display said dictation segment information on said video display device.

11. A dictation transcription interface as recited in claim 10, wherein said interface means being further operative to control a selected one of a plurality of transcription functions in response to said vectored interrupt handler system processing a selected one of said plurality of said input interrupt signals.

12. A dictation transcription interface as recited in claim 11, wherein one of said plurality of said transcription functions comprises adjustment of volume of said audio signal.

13. A dictation transcription interface as recited in claim 12, wherein said interface means receives a selected one of a plurality of status signals containing information about the status of application program operations from said application program in response to said vectored interrupt handler system processing a selected one of said plurality of said software interrupt signals.

14. A dictation transcription interface as recited in claim 13, wherein said interface means supplies to said digital dictation recorder a selected one of a plurality of formatted status signals having a signal format compatible with said digital dictation recorder by formatting said selected one of said plurality of said status signals.

15. A dictation transcription interface as recited in claim 11, wherein one of said plurality of said transcription functions comprises the initiation of displaying said information corresponding to said dictation segment on said video display device.

16. A dictation transcription interface as recited in claim 10, wherein said interface means further comprises an external audio port for receiving an external signal containing dictation from an external source.

17. A dictation transcription interface as recited in claim 16, wherein said interface means supplies a digitized external signal to said digital recorder upon converting said external signal, said recorder operative to record said digitized external signal.

18. A dictation transcription interface for use in combination with a digital dictation recorder for generating a sequence of digitized dictation signals that comprise a dictation segment and a digitized identification signal containing information corresponding to said dictation segment and a general purpose digital computer system characterized by a computer central processing unit, a computer memory, a computer clock, a periodic timer interrupt circuit, a computer bus, a video display device, and an input device, for running an application program, said computer system further operative for running an operating system having a vectored interrupt handler system for processing a plurality of timer interrupt signals derived from said computer clock, a plurality of input interrupt signals from said input device, and a plurality of software interrupt signals from said application program, comprising:

communications interface means coupled to said dictation recorder for supplying a first signal in response to said dictation segment and supplying a second signal in response to said digitized identification signal;

a processor system coupled to said communications interface means for supplying a translated signal by translating said first signal and supplying a message signal having a signal format compatible with said processor system by processing said second signal, said message signal containing said dictation segment information of said digitized identification signal;

conversion means coupled to said processor system for supplying an audio signal to an audio port to communicate said dictation segment to a transcriptionist by converting said translated signal; and memory storage means, connected to said processor system via a host bus and to said computer central processing unit via said computer bus, for generating a stored message signal by storing said message signal;

said application program being operative to receive said stored message signal from said memory storage means in response to said vectored interrupt handler system processing a selected one of said plurality of said timer interrupt signals;

said application program responsive to said stored message signal to generate a video message signal for displaying said dictation segment information on said video display device.

19. A dictation transcription interface as recited in claim 18, wherein said communications interface means comprises a universal digital loop transceiver.

20. A dictation transcription interface as recited in claim 18 further comprising isolation means, connected between said digital dictation recorder and said communications interface means, for electrically isolating said digital recorder from said transcription interface means.

21. A dictation transcription interface as recited in claim 18, wherein said processor system comprises:

a digital signal processor for supplying said translated signal by translating said first signal and supplying said message signal by formatting said second signal; and a host processor, connected to said digital signal processor via a host bus, for processing said message signal.

22. A dictation transcription interface as recited in claim 18, wherein said conversion means comprises:
an analog-to-digital converter (ADC) for supplying an analog signal by converting said translated signal; and
an amplifier connected between said ADC and said audio port for supplying said audio signal by amplifying said analog signal.

23. A dictation transcription interface as recited in claim 18, wherein said memory storage means comprises random access memory.

24. A dictation transcription interface as recited in claim 18 further comprising a processor clock having a bus clock period, said processor clock connected to said processor system.

25. A dictation transcription interface as recited in claim 24, wherein said computer central processing unit writes a transcription control signal for controlling a transcription function via said computer bus to said memory storage means during a first cycle of said bus clock period and in response to said vectored interrupt handling system processing a selected one of said plurality of said input interrupt signals, wherein said memory storage means generates a stored transcription control signal by storing said transcription control signal.

26. A dictation transcription interface as recited in claim 25, wherein said processor system reads said stored transcription control signal from said memory storage means via said host bus during a second cycle of said bus clock period.

27. A dictation transcription interface as recited in claim 26, wherein said processor system controls a selected one of a plurality of transcription functions by processing said stored transcription control signal.

28. A dictation transcription interface as recited in claim 27, wherein one of said plurality of transcription functions comprises adjustment of gain of said translated signal to adjust the volume of said audio signal.

29. A dictation transcription interface as recited in claim 27, wherein one of said plurality of transcription functions comprises initiation of displaying said information corresponding to said dictation segment on said video display device.

30. A dictation transcription interface as recited in claim 24, wherein said processor system writes said message signal via said host bus to said memory storage means during a second cycle of said bus clock period, whereby said memory storage means generates said stored message signal by storing said message signal.

31. A dictation transcription interface as recited in claim 30, wherein said computer central processing unit reads said stored message signal from said memory storage means via said computer bus during a first cycle of said bus clock period and in response to said vectored interrupt handling system processing a selected one of said plurality of said timer interrupt signals.

32. A dictation transcription interface as recited in claim 31, wherein said computer central processing unit transfers said stored message signal via said computer bus to said application program by writing said stored message signal to a selected portion of said computer memory recognized by said application program.

33. A dictation transcription interface as recited in claim 24, wherein said computer central processing unit writes a status signal having information concerning the operation of said application program via said computer bus to said memory storage means during a first cycle of said bus clock period and in response to said vectored interrupt handling system processing a selected one of said plurality of said software interrupt signals, wherein said memory storage means generates a stored status signal by storing said status signal.

34. A dictation transcription interface as recited in claim 33, wherein said processor system reads said stored status signal from said memory storage means via said host bus during a second cycle of said bus clock period.

35. A dictation transcription interface as recited in claim 34, wherein said processor system supplies to said digital recorder a formatted status signal having a signal format compatible with said digital recorder via said communications interface upon processing said stored status signal.

36. A dictation transcription interface as recited in claim 18 further comprising external audio interface means for receiving an external signal containing dictation from an external source.

37. A dictation transcription interface as recited in claim 36, wherein said external audio interface means comprises;
an external audio signal port; and
an input amplifier connected between said external audio signal port and said conversion means for supplying an amplified external signal by amplifying said external signal.

38. A dictation transcription interface as recited in claim 37, wherein said conversion means comprises a coder/decoder (CODEC) for supplying a digitized external signal to said processor system by converting said amplified external signal.

39. A dictation transcription interface as recited in claim 38, wherein said processor system sends said digitized external signal to said dictation recorder via said communications interface, said dictation recorder operative to record said digitized external signal.

* * * * *